(12) United States Patent
Toebes

(10) Patent No.: US 7,698,631 B1
(45) Date of Patent: Apr. 13, 2010

(54) STATELESS ONLINE WEB PAGE EDITING SYSTEM AND METHOD

(75) Inventor: John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 10/902,415

(22) Filed: Jul. 29, 2004

(51) Int. Cl.
*G06N 3/00* (2006.01)
(52) U.S. Cl. ...................................... 715/234
(58) Field of Classification Search ............... 715/530, 715/513, 501.1, 539, 517, 523, 234, 243, 715/254, 255
See application file for complete search history.

(56) References Cited

U.S. PATENT DOCUMENTS

| | | | |
|---|---|---|---|
| 6,496,203 B1 * | 12/2002 | Beaumont et al. | 715/762 |
| 6,578,000 B1 | 6/2003 | Dodrill et al. | |
| 6,643,663 B1 * | 11/2003 | Dabney et al. | 707/102 |
| 6,785,891 B1 * | 8/2004 | Allen et al. | 719/313 |
| 7,000,184 B2 * | 2/2006 | Matveyenko et al. | 715/530 |
| 2002/0059344 A1 * | 5/2002 | Britton et al. | 707/513 |
| 2003/0204810 A1 * | 10/2003 | Dam et al. | 715/500 |
| 2004/0148565 A1 * | 7/2004 | Davis et al. | 715/501.1 |

OTHER PUBLICATIONS

Editlet—Browser Based, Cross Platform—Copyright © 1998-2003 Akmin Technologies, 1 page.
Macromedia, Inc., Macromedia Dreamweaver MX 2004, "Build Professional Websites And Applications", Copyright © 1995-2005, 3 pages.
Evrsoft, "Software" (i.e., "1st Page 2000, Version 2.0 Free Edition", Copyright © 2005, 2 pages.
Yahoo! Inc., Web Site Editors > Wikis, Copyright © 2005, 1 page.
Micrsoft Corporation, Microsoft Office Online, "FrontPage", Copyright © 2004, 2 pages.
Yahoo! Inc., "Yahoo! GeoCities", "Yahoo! PageBuilder", Copyright © 2005, 2 pages.
Jammer, "Obfuscator", [online] Feb. 8, 2004 [retrieved on Jan. 15, 2009]. Retrieved from the Internet: <URL: http://web.archive_org/web/20050728132930/rzronlinefr/docs/shopijammerhtm>, pp. 1-6.
Jacobs, "HTML (Un)Compressed 6.1.2", [online] Aug. 1, 2002 [retrieved on Jan. 15, 2009]. Retrieved from the Internet: <URL: http://web.archive.org/web/20020823002106/home.tiscali.be/Jacobs.Jan/htmlcomp/index.htm>, pp. 1-2.

(Continued)

*Primary Examiner*—Kyle R Stork
(74) *Attorney, Agent, or Firm*—Leon R. Turkevich

(57) ABSTRACT

A system and a method of editing Web page online wherein the original web page is converted into block version web page by creating a server based application which breaks HTML into functional nested blocks and delivers a web based interface to add/delete/modify/reorder those blocks. A server based application reads in an HTML page to be edited and breaks it down into HTML blocks, which may be converted into an HTML editing form by putting annotations around each block allowing the user to choose an operation to apply to that block such as edit or delete. A "stateless" web page editing system and method is provided such that a user can edit a web page independently of dependence on, or connection to, the server from which the page was obtained and in which the page resides.

20 Claims, 7 Drawing Sheets

OTHER PUBLICATIONS

Drupal, "Drupal.org -- Community Plumbing", [online] Jul. 27, 2004 [retrieved on Sep. 17, 2009]. Retrieved from the Internet: <URL: http://web.archive.org/web120040727000738/http://drupal.org/>, pp. 1-3.

* cited by examiner

> TIFF (Uncompressed) decompressor
>     are needed to see this picture.
>
> This is a test paragraph with a Link to Google to show you how a paragraph can work.
> - List Item 1
> - List item 2 which links to Yahoo as an example.
> - Third List item
>
> First Cell
> Second Cell
>
> Third Cell
> Forth Cell
>
> QuickTime™ and a
> TIFF (Uncompressed) decompressor
>   are needed to see this picture.
>
> Sample Text File

Fig. 5

```
<h1><img src=" images/h1_status.gif" alt="status"></h1>
<p>This is a test paragraph with a Link to <a
href="http://www.google.com">Google</a>
 to show you how a paragraph can work. </p>
<ul><li>List Item 1</li>
<li>List item 2 which links to <a href="http://www.yahoo.com">Yahoo</a>
 as an example. </li>
<li>Third List item</li>
</ul>
<table border="1"><tr><td> First cell</td>
<td> Second Cell</td>
</tr>
<tr><td> Third Cell</td>
</td> Forth Cell</td>
</tr>
</table>
<img src="/techCenter/proj/test/images/circle.jpg" alt="Circle" height="50"
width="50"><a href="/techCenter/proj/test/upload/empty.txt">Sample Text
File </a>
```

Fig. 6

STATELESS ONLINE WEB PAGE EDITING SYSTEM AND METHOD

FIELD OF INVENTION

Copyright Notice

A portion of the disclosure recited in the specification contains material which is subject to copyright protection. Specifically, a Computer Program Listing Appendix is provided that includes source code instructions for a process by which the present invention is practiced in a computer system. The copyright owner has no objection to the facsimile reproduction of the specification as filed in the Patent and Trademark Office. Otherwise all copyright rights are reserved. The Source Code Appendix is included on one CDROM (two copies) compatible with the Microsoft Windows operating system. The machine format is IBM PC compatible. A single ASCII text file is included on the CDROM with the file name "source.txt". The file size is 27 KB and it was created on Jul. 22, 2004.

Embodiments of the present invention relate in general to a stateless online editing system and method. More specifically, embodiments of the present invention relate to a method and tool for stateless editing of the web site at the client's side after an "original web page" is converted to a "block-version web page" at the server.

BACKGROUND OF THE INVENTION

Creating content for web pages often involves learning arcane editors or having specialized tools to locally edit content and upload them to a server. Such tools tend to be specific to a single operating system or tied to a specific browser or utilize an underlying database such that web pages are constructed on the fly from meta descriptions of the content.

In the first case, the choice of tools limits the user to specific operating systems or browsers. While this is appropriate for some populations, this does not offer a general solution for online or offline editing.

With a database approach, the performance of the web server is limited to the speed by which the underlying engine can generate HTML from the meta description. META description is HTML tags that describe the contents of a web page. The primary purpose of Meta tags is to provide a compact way to represent the abstract contents of a web page or to reference dynamic content.

The proliferation of client-server networks such as the Internet, and in particular the Word Wide Web, makes a large amount of information accessible to anyone connected to the Internet. In general, the layout language for a Web document is Hypertext Markup Language (HTML). Using browser software such as Netscape™ Navigator or Internet Explorer™, a user can make a request from a client computer to a server to access a document stored at a particular server. When the server receives the user's request, it sends the requested HTML Web document to the client where the document can be displayed. Originally, Web sites were created by writing HTML text files, line by line. Then, HTML editors were created and eased some of the drudgery of writing HTML files. Moreover, once a Web site is created, it typically needs to be maintained and updated. This is because information is dynamic. It changes as new information becomes available. Hence, maintaining a Web site has been an expensive, time-consuming, and labor intensive task.

Generally, Web editing tools fall into the following classes: (i) Offline WYSIWYG editor, such as FrontPage and Dreamweaver, that pull the content into a local program which allows the user to enter and manipulate the content in a visual manner with the tool automatically generating the HTML; (ii) Meta description tools which allow editing of block sections; (iii) Web page generators which take a template of information and then generate an initial page; and (iv) JavaScript/Java/Active X web editors which provide a WYSIWYG environment within the web page by downloading code which implements an editor.

(i) The first class of web editing tools includes WYSIWYG editors such as HTML Editor which has the following attributes and capabilities:

HTML Editor is a semi-WYSIWYG editor for an HTML document. HTML is a coding system for specifying the format of a text document, and for creating hypertext links between a document and other documents that accessible on the same computer or through the World Wide Web (WWW). The location of a document that is linked to another is specified with a Uniform Resource Locator (URL).

The HTML Editor generally supports the following features:
  simple text editing.
  edit text of size>32K.
  insertion of common HTML 1.0, 2.0, 3.0, and Netscape tags through button clicks, menu selections and key strokes.
  stylized text to indicate styles a browser may use when viewing a document. These styles can be edited.
  undo and redo of basic tag insertion.
  editable palette of user tags.
  single key strokes for insertion of HTML escape codes for composed characters.
  find and replace commands for text editing.
  edit list of URLs from the current document.
  setting of a root directory for the URL of a local file.
  standard file dialog for constructing the URL of a local file.
  switch to a browser such as Netscape, Mosaic or MacWeb with the click of a button. Switching to a browser will open a browse window for the current document.
  hide tags for a quick document preview.
  restyle complete document.
  automatic styling of documents from other applications.
  conversion of UNIX and DOS text files to Macintosh text.
  conversion of non-ASCII characters from a text file or the clipboard to HTML escape codes for composed characters.
  printing.
  support for Internet Config Preferences.
  support for Menu Sharing.
  command-click launch of selected URL.

Additionally, the user is also allowed to edit the HTML. Once the content is complete, it is then pushed back to the server for posting. Note that while these tools are often described as online editing tools, the actual editing takes place independent of the web server.

One common feature of this class of editors is the ability for the user to edit an HTML document by selecting and editing the individual files. The user is presented with a directory of individual files from where he can choose and select the required procedure. The drawback of these editing methods is that the user has to have prior understanding of the HTML document, and the user must know both the name and location of the file. Many users are however not aware of their HTML document's file structure.

The distinguishing feature of this class of editors is that the implementation is tied to a specific operating system such as Microsoft Windows™ or Linux. In general if the implementation is specific to an operating system, it will fall into this category.

(ii) The second class of existing web editing tools includes Meta description tools such as WIKI and PHP based servers. The generated content is not specifically stored as HTML, but as meta text or custom tags in a database or other file. These are online editing tools which generally apply the content changes immediately. Standard Weblogs are a good example of this type of technology. Yahoo lists a good set of the WIKI type on their site.

(iii) The third class of existing web editing tools include Web page generators which take a template of information and then generate an initial page. Often these tools are oriented toward a write-only approach such that a separate tool is necessary to edit the content once it is generated. There are many examples of these with most ISPs or web hosting services such as Geocities, and even universities including this as a basic part of their service for allowing users to create new web pages.

(iv) The last class of existing web editing tools includes JavaScript/Java/Active X web editors that provide a WYSIWYG environment within the web page by downloading code which implements an editor, are similar in approach to the first category of offline editors except that it is downloaded on demand. These implementations are tied to browser and runtime environments. Examples of these include "Editlet," a Java-based program executed as an applet. The downloaded applet loads the HTML to be edited and provides a WYSIWYG environment implemented using a portable language which runs on the machine.

For example, a brief summary is presented here as to how a web page editor works as explained in www.webceo.com: Page editor works in the website centric mode. Browsing to the local copy of the website on the setup tab and one will be able to edit every page or a group of pages using other tabs. Edition of a group of pages is possible by saving one Meta description through all the pages of the site. Immediate changes can be seen while editing all headings found on a given page for that one need not go to HTML code but <H1>-<H6> tags are available for editing in the usual mode. ALT tags are used for editing pictures which are important to search engines and disabled visitors. It is very handy because the selected link is highlighted in the preview window. In mixed mode editing one need not have to switch between the HTML and WYSIWYG mode while editing the web pages. Both the views are permanently on the screen. Changing the code changes the visible copy and vice versa and it is up to the editor to choose which is to be edited first. Finding and replacing word combination across a web site either to replace all matches found throughout a few pages, at once or confirm every replacement also can be edited. The web page editor allows watching competition and evaluating their techniques. By using content tab not only evaluation edition of one's own web site but also can be applied to competition wherein their HTML code and content will be prepared for analysis and evaluation. By doing so one can exactly see what META tags, headings, ALT tags, anchor text in links their competitors use for their own pages.

In a typical client-server computer environment, the Web site is created and stored in the server. A typical user in a remote client computer cannot create a Web site to be stored in the server. The client may only access the Web site in the server by using a Web browser such as Netscape™ Navigator or Internet Explorer™. Further, it is difficult for the typical user in a client computer to edit a Web site stored in the server. Hence, a user with remote access to the server doesn't enjoy the benefit of being able to edit a Web site.

BRIEF SUMMARY OF EMBODIMENTS OF THE INVENTION

Embodiments of the invention provide a method for easily and efficiently editing a Web Page in a client-server environment from a client computer after an "original web page" is converted to a "block-version web page" at the server. According to embodiments of the invention, web page editing is accomplished by creating a server based application which breaks the HTML into functional nested blocks and delivers a web based interface to add/delete/modify reorder those blocks. Embodiments of the present invention comprise a server-based application written in a language, such as PERL, and provide for an operating system and method of editing web pages online without having to have a customized web server to deliver the content once edited, resulting in higher performance web sites without giving up the ability to quickly edit the content.

Embodiments of the present invention provide for a method for editing a web page comprising reading a web page to be edited, selecting an attribute on the web page to be edited, and editing the attribute to produce an edited attribute on the web page. The method may additionally comprise dividing a coded HTML page into blocks, converting the blocks into editing form, and displaying the editing form. A request to edit the web page may be generated, and a determination may be made if a new block is to be added. The method may further additionally comprise determining if the edited attribute is to be previewed.

Embodiments of the present invention also provide a system for editing a web page comprising means for receiving an attribute on a web page for editing, and means for receiving an edited attribute on the web page. The embodiments also provide a machine-readable medium having stored thereon instructions for receiving a web page to be edited, receiving an attribute selected on the web page to be edited, and editing the attribute to produce an edited attribute on the web page.

Embodiments of the present invention also further provide a method for stateless online web page editing wherein a server based application is created which breaks the HTML into functional nested blocks and delivers a web based interface. The method comprises the steps of breaking coded Website HTML by a server-based application program into functional nested blocks, storing the blocks in a storage device coupled to a client-server computer network, and generating from a client computer to a server computer a request to edit the coded Web site HTML having available Web site elements. The method further comprises transmitting a list of the available Web site elements from the server to the client for display using a website based interface, editing at least one of the Web site elements of the Web site HTML to produce an edited Web site element, posting the edited Web site element to the server and passing by the server the edited Web site element to an application program of the computer. The method may also further comprise updating the coded Web site HTML with the edited Web site element in a database of the computer and transmitting the updated coded Web site HTML to the server by the application program of the computer, and passing on the updated coded Web site HTML by the server to the client which may display the updated coded Web site HTML. The storing comprises storing the blocks in the database. The blocks may comprise annotations. The application program may comprise commands on the coded Web site HTML to insert a new block, and the website based interface may comprise an HTML editing form. The method may further additionally comprise converting the functional nested block into an HTML editing form. The website base interface includes commands on the coded Web site HTML. The editing step may include selecting the commands on the coded Web site HTML, and the posting step may comprise sending back to the application program all of the variables of the coded Web site HTML page which contains HTML data blocks.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

BRIEF DESCRIPTION OF THE DRAWINGS

FIG. 5 shows a sample portion of a web page display.

FIG. 6 shows HTML corresponding to the web page display of FIG. 5.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
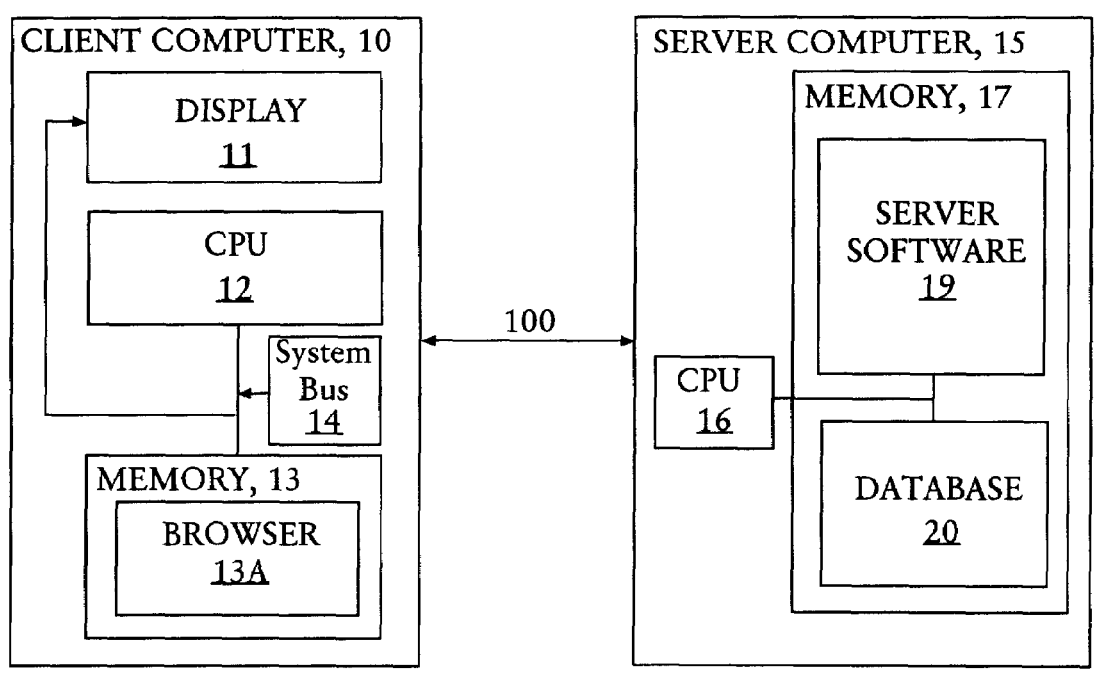
FIG. 1 shows client-server architecture adopted for embodiments in the present invention.

FIG. 1 illustrates the architecture of a Web connection between a client computer and a server computer. In FIG. 1, a client computer 10 includes a display monitor 11, a CPU 12, and a memory 13 which is connected together by a system bus 14. Memory 13 stores browser software 13A to communicate to server computer 15. It will be understood by a person of ordinary skill in the art that client computer 10 can also include other elements not shown in FIG. 1 such as disk drives, keyboard, mouse etc. A server computer 15, on the other hand, includes a CPU 16 and a memory 17 which are connected together by a system bus 18. Memory stores server software as well as a set of programs 19 implemented in the present invention. A person of ordinary skill in the art will understand that memories 13 and 17 may also contain additional information such as applications programs, network communication programs, operating system software, data etc. Client computer 10 and server computer 15 are linked together by a network 100. The database file 20 contains the website and can include any file system, data collection or other storage format or architecture for holding server information. The software program 19, preferably a Common Gateway Interface (CGI) program, resides in the server computer and breaks the HTML codes into blocks and processes data submitted from a client. After processing the data, CGI program returns, on the fly, newly processed or updated information, such as a new HTML document, to the server which sends the new information to the Web browser to be displayed on the client computer. It is to be understood that the above software modules, such as the CGI program, are well known in the art and can be easily written and/or modified to implement any Web editing and maintenance methods.

Figure 2:
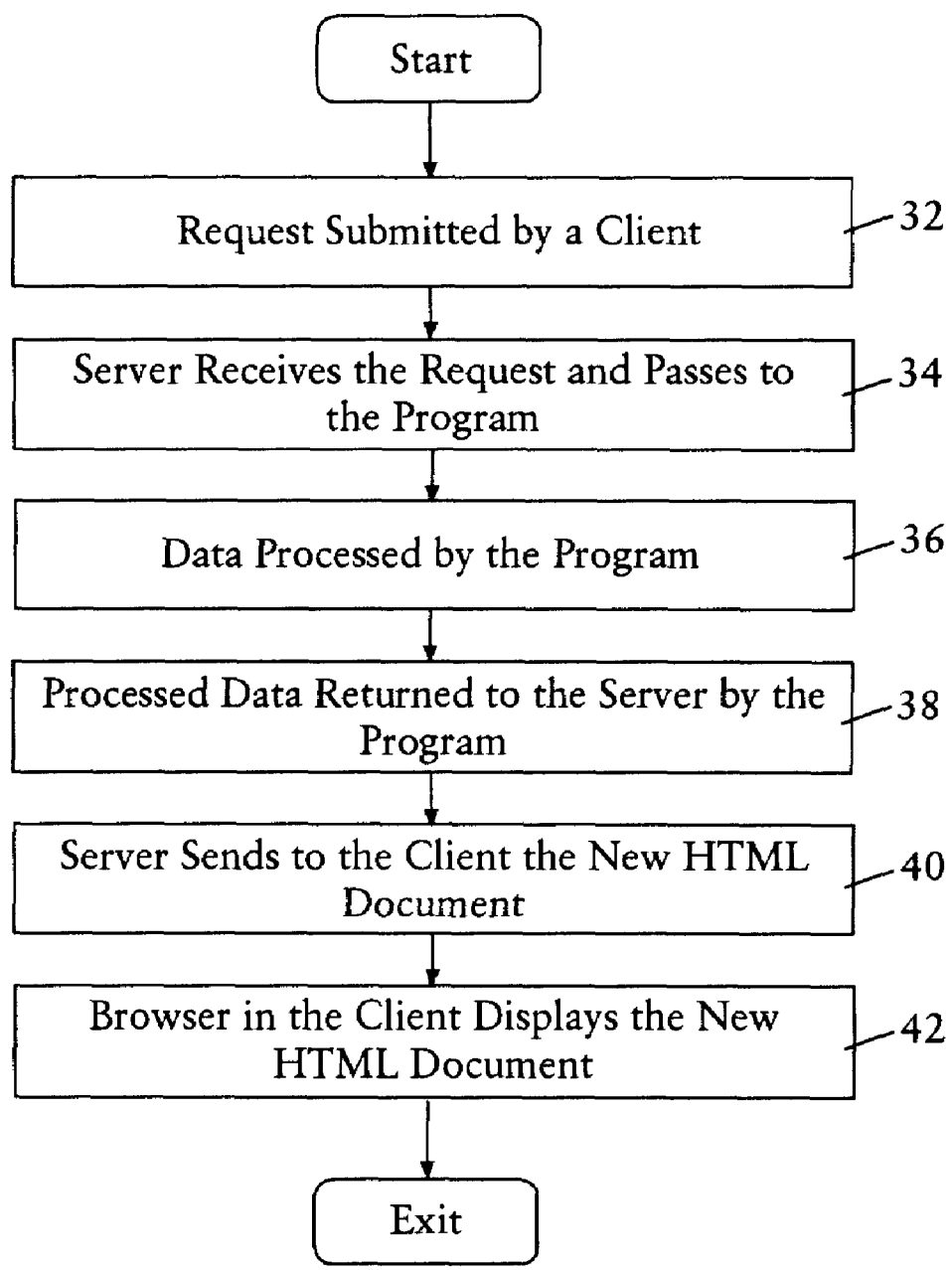
FIG. 2 shows the flow chart of webpage editing in conventional method.

FIG. 2 illustrates a flow diagram of a basic interaction between a server and a client in a conventional method. At step 32, a user at a client computer submits a request to the server for a specified action. The server, at step 34, receives the request and passes it on to a software program, preferably a CGI program. At step 36, the CGI program processes the data related to the request, and subsequently in accordance with step 38, the CGI program dynamically generates a new HTML document and returns it to the server. At step 40, the server sends the new HTML document to the client, who then in accordance with step 42, subsequently displays the HTML document for the user by using a browser program such as Netscape™ Navigator or Internet Explorer™. It should be appreciated that the steps illustrated in FIG. 2 represent how a server and client interact to process a request from a user. Hence, it should be recognized that these steps are generally conducted each time a user makes a request, starting from a user request to the display of a response on the client computer. In general, except where otherwise noted, the discussion herein for embodiments of the present invention applies equally to the Web and to Web-like Intranets.

Figure 3:
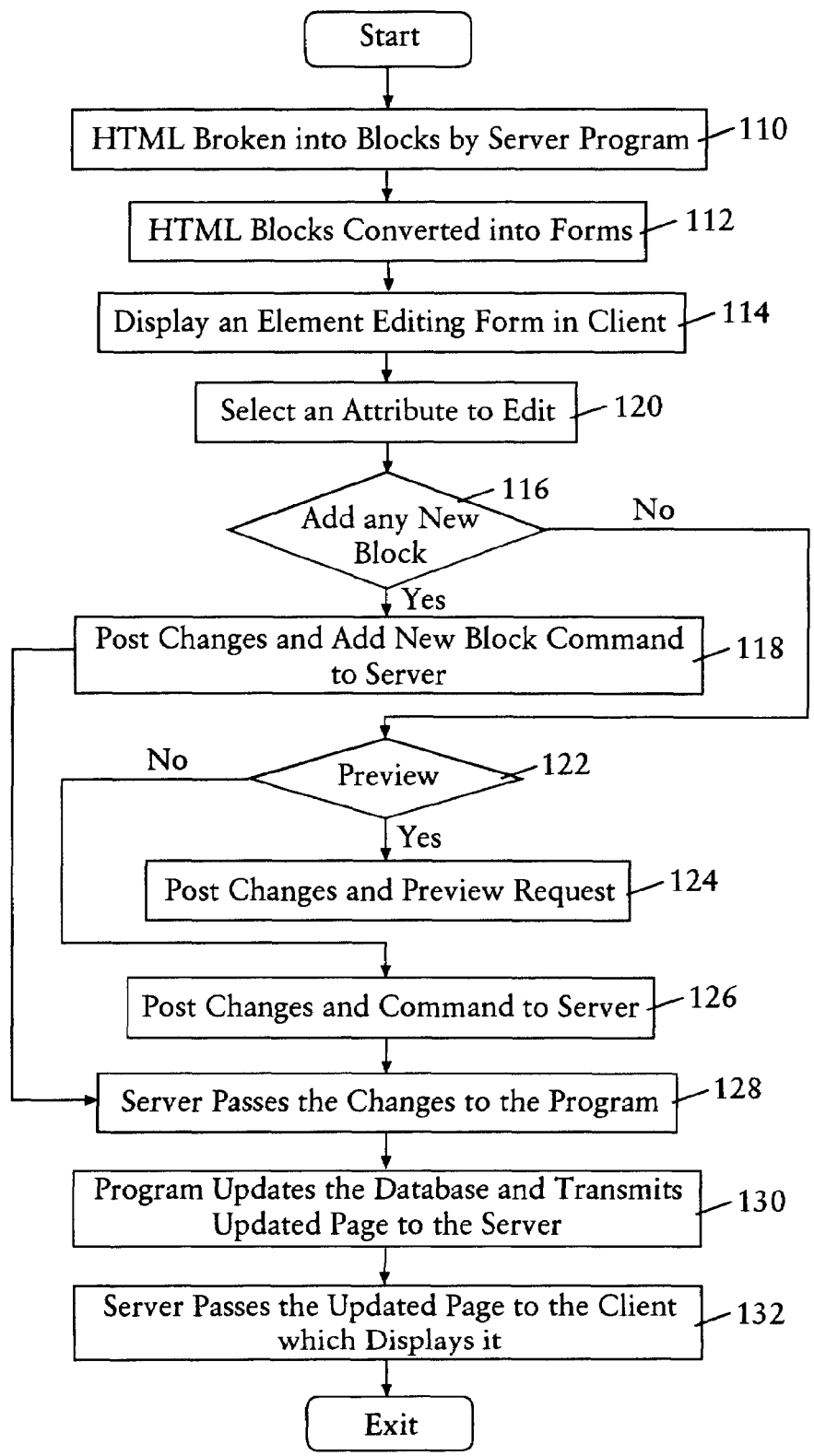
FIG. 3 shows the flow chart of webpage editing in accordance with embodiments of the present invention.

FIG. 3 illustrates a flow diagram for embodiments of the present invention. The technology for embodiments of the present invention comprises a server based application written in a language such as PERL. It reads in the original web page to be edited and breaks it down into HTML blocks (110), nesting as appropriate. For example, the content encapsulated in a <H1></H1> pair is treated as a header block. The blocks are converted into an HTML editing form (112) by putting annotations around each block allowing the user to choose an operation to apply to that block such as edit or delete. It is also important to note that all of the HTML content is stored as data variables in the generated block version web page. This form is then displayed in the client through the browser (114). An application program also provides commands on the block version web page to insert a new block (116), if needed a new block is to be inserted (118). When the user selects a command or attribute on the original web page, such as edit/reorder/delete (120), the HTML post back to the application includes all of the variables on the page which contain the HTML data blocks (126). Note that all the content of the original web page is present in this HTML post so that the application does not have to return to the original web page at any point of time. A command is also provided to allow the user to preview the page based on the current edited state (122). When this command is requested, the application generates a new web page based on the HTML content included in the post request (124). Server then passes the changes to the program (128). Program updates the database and transmits updated page to the server (130). Server passes the updated page to the client which displays it (132).

Upon a request to edit an original web page, the original web page may be broken into nestable blocks. The blocks are stored in the block-version web-page which is sent to the user's browser. Commands issued from the user's browser are sent back to the server along with HTML blocks from the block-version web page which are posted as parameters. The editing application on the server applies the commands based on the HTML block parameters in the block-version web page. The original web page does not have to be modified at this point.

If the user wishes to view a preview of the block version web page being edited as the block version web page will appear when viewed by a browser, the editing application generates a preview of the page in the current state by reconstructing the HTML from the blocks in the parameters.

Undo can be accomplished by using the "BACK" button in the browser since the state of the editing is stored with the variables in the block version web page currently being viewed in the user's browser during editing. The final web page can be generated at any time (including storing intermediate changes back to the original web page) based on the variables stored in the block version web page. The edited block version web pages are standard HTML which can be served up directly from the disk by an unmodified web server.

Figure 4:
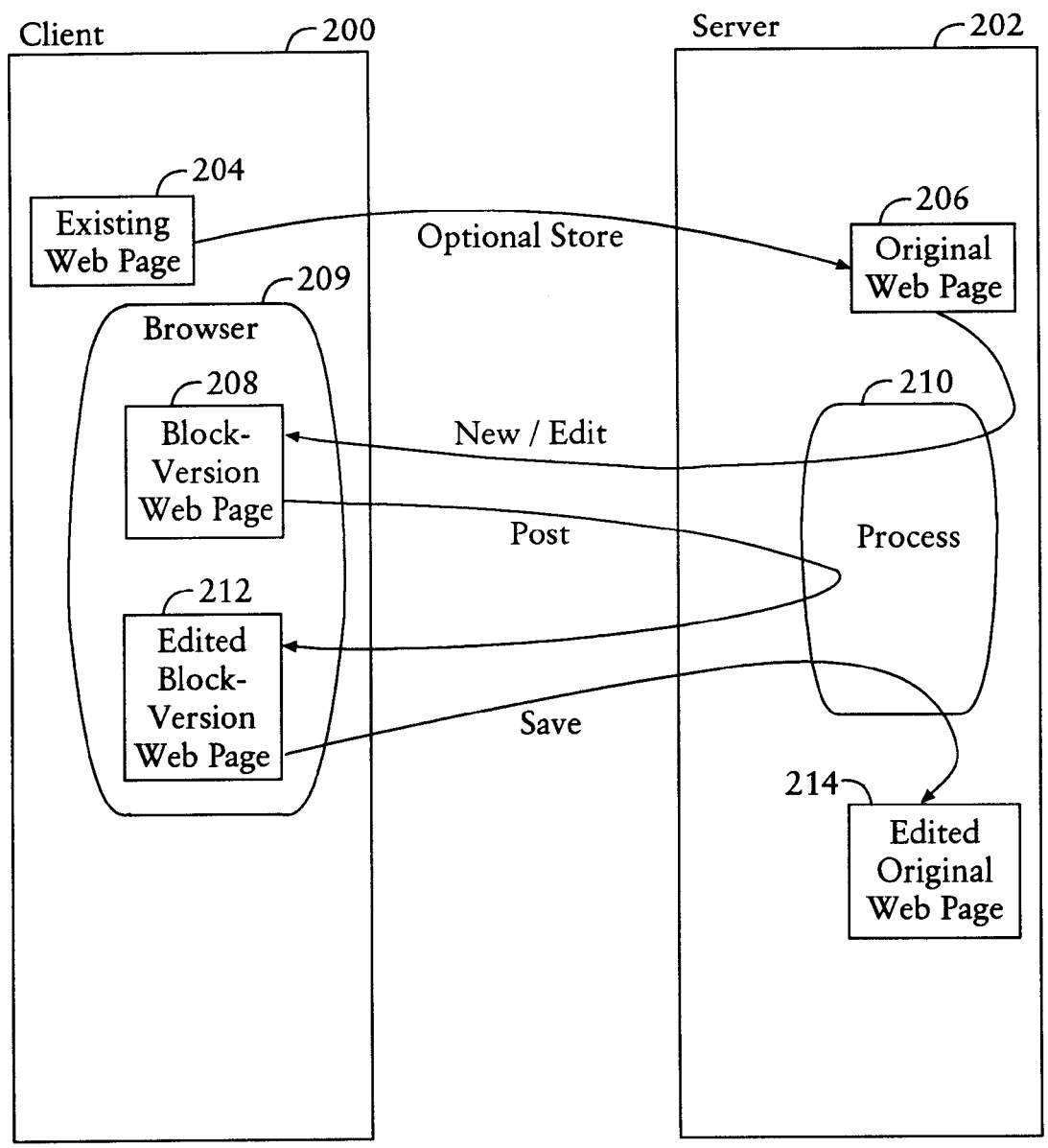
FIG. 4 shows basic items and exchanges between a client and server in an editing session according to an embodiment of the invention.

In FIG. 4, client 200 can start an editing session to edit an existing web page document, or a new web page document can be created. Web page 204 is shown transferred from client 200 to server 202 in an "optional store" step to illustrate the case where a web page author has already prepared a web page and desires to edit it using an approach of embodiments of the present invention. Web page 204 is transferred to server 202 where it is stored as original web-page 206. Note that other embodiments can use any approach to providing web page data to be edited to the server. For example, a server can have access to a web page (e.g., the web page is already resident on the server) without having a requirement to transfer the web page to the server.

A user at client 200 uses web page browser 209 to invoke editing through server process 210. In a preferred embodiment, any standard web page browser can be run at the client side. Server process 210 may, by way of example only, include PERL script that handles the functions described herein. Although specific functions and architecture such as the client-server arrangement are presented, other approaches are possible. For example, some or all of the steps and functions described herein can be performed in a standalone system (i.e., without a separate server computer), peer-to-peer, timeshared, etc. In general, any suitable processing architecture, network arrangement or other processing design can be employed for embodiments of the present invention.

Although an embodiment of the invention uses PERL script, it is to be understood that any suitable script or other programming or control language can be used. It should be apparent that discussion of specific steps is but one way to achieve functionality according to the present invention and other approaches can use more or less steps, or vary in other ways from those discussed.

The user is provided with an initial interface for invoking basic functions of the server process 210. For example, the user can indicate that the original web page is to be edited. Or the author can indicate that a new web page is to be created for subsequent editing. In the example of FIG. 4, original web page 206 is requested for editing. In response, server process 210 translates, or configures, original web page 206 into a block-version web page and provides it to browser 209.

The block version web page 208 includes the text and other content of the original web page arranged in a block format. Also included in the block version web page 208 are editing controls and other HTML constructs to facilitate editing. For example, the user is provided with controls to edit, reorder or deleted blocks. Tags and other html constructs are used to provide a formatted display via the web browser of the text in the block version web page 208.

Next, the author performs an editing function such as, modifying a block of text in the block version web page 208 that is displayed. For example, the user can select a button to "edit" a block of text and can then add text to the block. Any manner of editing commands and controls can be provided. At the completion of the editing steps (i.e., after the block of text is edited and a control is activated to indicate completion) the block version web page is "posted" back to server 202 along with the new text. Server process 210 receives the edited block version web page and reformats a new web page as edited block version web page 212. The edited block version web page 212 is transferred back to browser 209 at client 200 and the user is presented with a refreshed display showing the results of the edit step.

In this simplified example, the user next selects that the edited text be saved. Saving results in a post of the current state of the edited block version web page 212 back to the server 202 where the edited block version web page 212 can be saved as edited original web page 214 (i.e., in a standard, non-block version, format). Naturally, any number of editing steps may be performed. Note that at any point in the editing process, after a block version web page 212, or edited block version web page 214, has been provided to the client 200 that any amount of time can pass before the user performs an editing or saving step. In this respect, the editing approach is "stateless" with respect to the client 200 and server 202 interaction since the current state of the editing session is not saved with external variable but is, instead, represented by conditions and states that are contained within the block version web page 208 residing on the client system. Other embodiments may include additional or less information in the web page and may include some information external to the web page, as desired.

Saving the edited document in standard ("original") format is optional. The document can be stored as a block version or in a different format. Saving of an edited version can cause the prior version to be discarded or overwritten. Many variations are possible.

An embodiment of the invention provides a "stateless" web page editing system in that a user can edit a web page independently of dependence on, or connection to, the server from which the page was obtained and in which the page resides. Thus, a user can start editing a page, disconnect from the web server for any number of days, and then connect back and continue on regardless of changes that might occur on the server. The state of web page editing and content of the web page being edited is kept in the block-version web page 208 so that when the user does a post (e.g., via selecting a command on the web editing interface) all of the text parts of the original web page are provided as a part of the post.

In other embodiments of the present invention it may be possible to achieve desirable results with only a portion of the parts of the original web page text included in the block-version web page. It may also be desirable to maintain less than a complete self-contained state record in each block-version web page, however, such approaches may not be strictly "stateless."

FIG. 5 shows a sample portion of a web page display. FIG. 6 shows the HTML corresponding to the web page display of FIG. 5.

Figure 7:
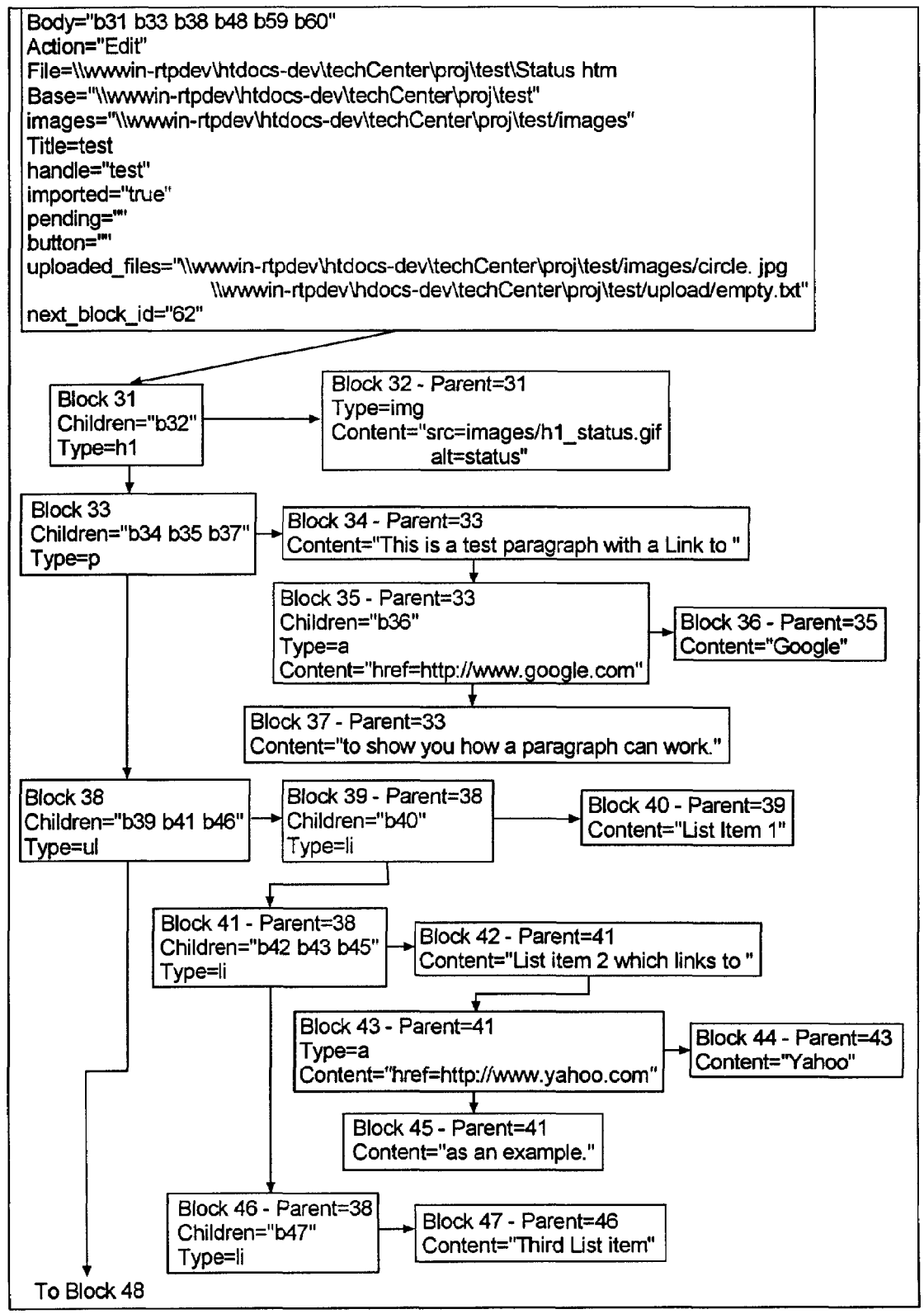
FIG. 7 is a first portion of a block version of the web page HTML of FIG. 6.
Figure 8:
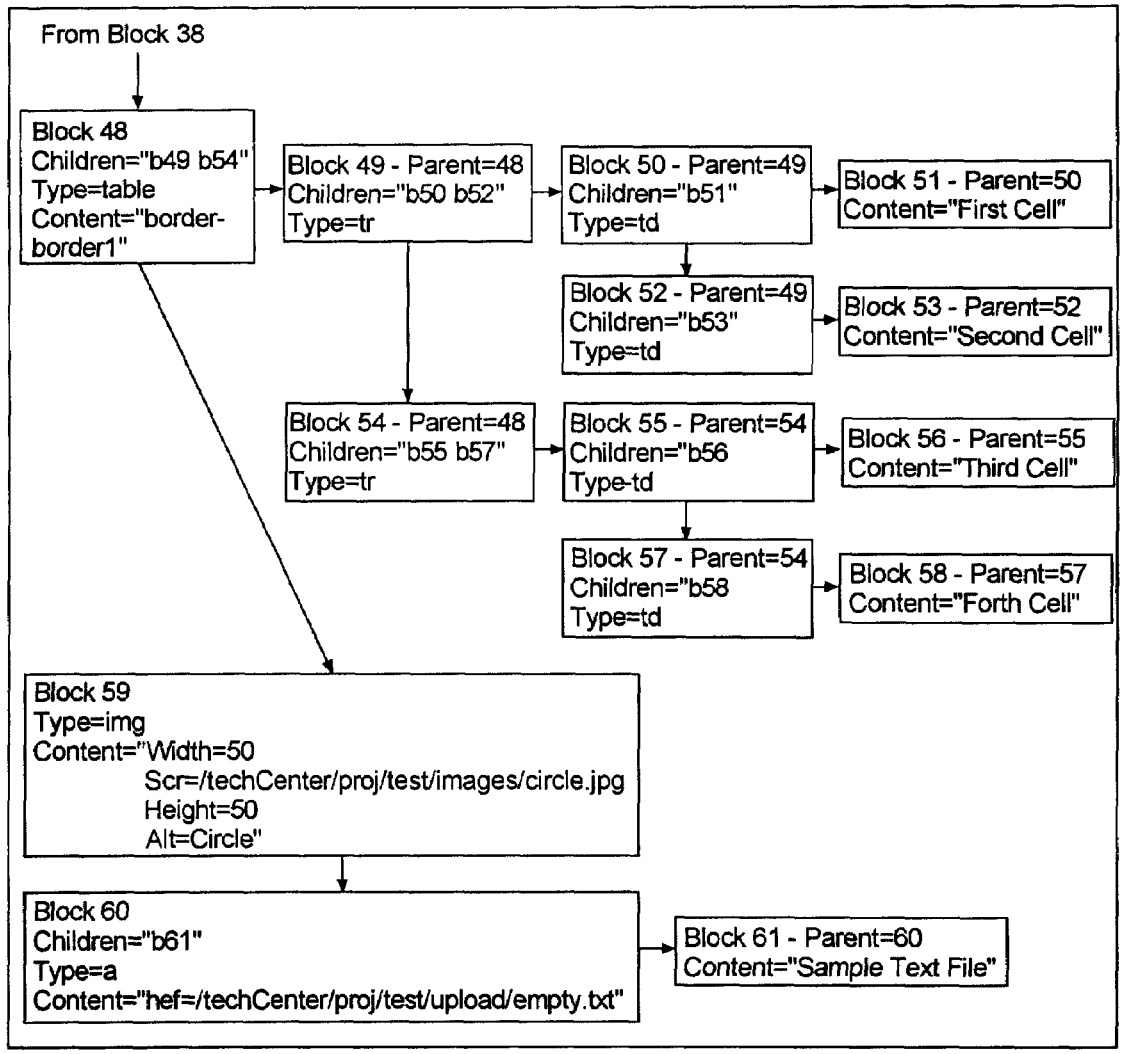
FIG. 8 is a second portion of a block version of the web page HTML of FIG. 6.

FIGS. 7 and 8 illustrate a design of, or breakdown into, a block version of the web page HTML of FIG. 6. In FIGS. 7 and 8, a block is indicated as a rectangle. Each block can have "Children," "Parent," "Type" and "Content" value associations. A "Children" type, if present, indicates blocks associated with a parent block that are affected by attributes or other properties of the parent block. For example, in FIG. 7, block 302 has children blocks b31, b33, b38, b48, b59 and b60. The children blocks of block 302 are referred to as a "Body" type (a special type) rather than a "Children" type since block 302 is the top block of the web page.

Block 31 has a single "Children" block, indicated as "b32". Block b31 also has a "Type" field of "h1" which means that block b31 has first-level header formatting, as is defined in standard HTML (e.g., font size, indentation, etc.). Arrows are used to show block parent/child relationships. Thus, an arrow from block 31 to block 32 indicates that block 31 is the parent of block 32 and that block 32 is the child of block 31. The parent/child relationship is also shown in the fields within the blocks such as the field within block 32 indicating "Parent=31". The "Type" field of block 32 is "img" to specify an image and the "Content" field is set to the location of the image so that the image can be retrieved and displayed.

The Content field can be encoded when there are multiple values that need to be stored in the string. This encoding is done by putting concatenating the list of items followed by a dash and followed by each item text preceded by the item name. For example, to encode an image having a four fields in it, one would use src%1falt%1fwidth%1ewidth%1f50%1fsrc%1f/techCenter/proj/test/images/circlejpg%1fheight%1f50%1falt%1fCircle This breaks down into four fields: src, alt, height, and width which are deliminted by a non printing character (%1f in this case) and separated from the actual values by another non-printing character (%1e in this case).

The type field may have several different values for indicating different block types as shown in Table I, below:

TABLE I

| Type | Usage | Content |
|---|---|---|
|  | Standard text pragraph. | Text of the paragraph |
| Img | Image file. | Encoded image information |
| table | Table | Encoded table information |
| tr | Table Row | Encoded row information |
| td | Table column | Encoded column information |
| ul | Bulleted list | Nothing |
| ol | Numbered list | Nothing |
| li | List Element | Nothing |
| a | Link | Encoded link information |
| P | Paragraph | Nothing |
| h1 | Header Level 1 | Nothing |
| h2 | Header Level 2 | Nothing |
| h3 | Header Level 3 | Nothing |

In addition to information about the individual blocks, basic information about the entire web page is also kept. Some of the basic types of information are shown in Table II.

TABLE II

| Field | Usage |
|---|---|
| Body | List of top level blocks separated by spaces. |
| Action | The action that the user is requesting. |
| File | The original file which was read in |
| Base | The directory where all references are based off |
| Images | The location where any images are stored |

TABLE II-continued

| Field | Usage |
|---|---|
| Title | The title of the web page |
| Handle | The project directory where the web page was contained (note that this is something specific to our implementation because we have mini-web sites with the larger web site) |
| Imported | Set to true to indicate that the file has been imported. This allows the editor to know when it has to read in the file. |
| Pending | List of blocks pending to be deleted. This is the list of the most recently added blocks which are deleted if the user doesn't change the content after selecting add block. For example if you add a paragraph and then don't fill in the text field for the paragraph, it can be automatically deleted. |
| Button | Identifies the block associated with the current command. |
| uploaded_files | List of files that have been uploaded as part of editing. |
| next_block_id | The next block number to be assigned in creating a new block. |

For the example of FIGS. 5-8 the Computer Program Listing Appendix provides the format in which the blocks are stored as hidden variable "s" in the HTML. Additional portions of the Appendix also show the format for a post back to the editor for an example command.

The foregoing description of a preferred embodiment of the invention has been presented for purposes of illustration and description. It is not intended to be exhaustive or to limit the invention to the precise form disclosed. Obvious modifications or variations are possible in light of the above teachings.

Although the invention has been described with respect to specific embodiments thereof, these embodiments are merely illustrative, and not restrictive of the invention. For example, a client computer can also include other elements such as disk drives, keyboard, mouse etc. Memory also contains additional information such as applications programs, network, communication programs, operating system software data etc. Although specific user interface web page editing controls such as buttons for moving up, moving down, deleting or editing a block of text have been described it should be apparent that other numbers and types of controls can be provided.

Any suitable programming language can be used to implement the routines of the present invention including PERL, C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for editing a web page, the method comprising:

identifying a first web page to be edited;

defining a plurality of editable blocks within the first web page, each editable block associated with one of a corresponding web page element in the first web page. or information about the first web page in its entirety;

generating a second web page allowing editing of the plurality of editable blocks by a client browser, the second web page including second web page elements for displaying the second web page, the second web page further storing hidden information representing content of the first web page and identifying relationships between the editable blocks, the hidden information enabling display of the content of the first web page without reference to the first web page;

sending the second web page to the client browser for display of the second web page, the display of the second web page allowing editing of the plurality of editable blocks;

receiving a post from the client browser, the post including the hidden information, wherein an edit by the client browser to an attribute of at least one of the editable blocks in the second web page is represented by an edit to a corresponding portion of the hidden information in the post; and generating a third web page implementing the edit based on the post and without needing to reference the first web page, the third web page being different from the first web page based on the edit.

2. The method of claim 1 additionally comprising accepting a signal from a user input device representing at least a portion of the edit.

3. The method of claim 1, wherein the editable blocks are nested.

4. The method of claim 1, wherein the edit includes a request to delete one of the editable blocks.

5. The method of claim 1, wherein the edit includes a request to add a block.

6. The method of claim 1 additionally comprising determining if the post includes a request to preview the edit.

7. An apparatus comprising:
a processor; and
a machine-readable medium including one or more instructions for performing the following:
identifying a first web page to be edited;
defining a plurality of editable blocks within the first web page, each editable block associated with one of a corresponding web page element in the first web page, or information about the first web page in its entirety;
generating a second web page allowing editing of the plurality of editable blocks by a client browser, the second web page including second web page elements for displaying the second web page, the second web page further storing hidden information representing content of the first web page and identifying relationships between the editable blocks, the hidden information enabling display of the content of the first web page without reference to the first web page;
sending the second web page to the client browser for display of the second web page, the display of the second web page allowing editing of the plurality of editable blocks; receiving a post from the client browser, the post including the hidden information, wherein an edit by the client browser to an attribute of at least one of the editable blocks in the second web page is represented by an edit to a corresponding portion of the hidden information in the post; and
generating a third web page implementing the edit based on the post and without needing to reference the first web page, the third web page different from the first web page based on the edit.

8. The apparatus of claim 7, wherein the editable blocks are nested.

9. The apparatus of claim 7, wherein the edit includes a request to delete one of the editable blocks.

10. The apparatus of claim 7, wherein the edit includes a request to add a block.

11. The apparatus of claim 7, wherein the machine-readable medium includes one or more instructions for determining if the post includes a request to preview the edit.

12. An apparatus comprising:
means for identifying a first web page to be edited, the means for identifying further configured for defining a plurality of editable blocks within the first web page, each editable block associated with one of a corresponding web page element in the first web page, or information about the first web page in its entirety; and
means for generating a second web page allowing editing of the plurality of editable blocks by a client browser, the second web page including second web page elements for displaying the second web page, the second web page further storing hidden information representing content of the first web page and identifying relationships between the editable blocks, the hidden information enabling display of the content of the first web page without reference to the first web page;
the apparatus configured for sending the second web page to the client browser for display of the second web page, the display of the second web page allowing editing of the plurality of editable blocks;
the apparatus further configured for receiving a post from the client browser, the post including the hidden information, wherein an edit by the client browser to an attribute of at least one of the editable blocks in the second web page is represented by an edit to a corresponding portion of the hidden information in the post;
the means for generating further configured for generating a third web page implementing the edit based on the post and without needing to reference the first web page, the third web page different from the first web page based on the edit.

13. A method comprising:
sending a request to edit a first web page having first web page elements;
receiving a second web page, the second web page including second web page elements for displaying of the second web page by a client browser;
displaying the second web page by the client browser enabling editing of editable blocks by the client browser, each editable block associated with one of a corresponding first web page element in the first web page, or information about the first web page in its entirety, the second web page further storing hidden information representing content of the first web page and identifying relationships between the editable blocks, the hidden information enabling display of the content of the first web page without reference to the first web page;
receiving by the client browser an edit to an attribute of at least one of the editable blocks in the second web page;
sending a post by the client browser, the post including the hidden information, the edit by the client browser represented in the post as an edit to a corresponding portion of the hidden information in the post; and
receiving a third web page implementing the edit based on the post, the third web page generated without needing to reference the first web page, the third web page different from the first web page based on the edit.

14. The method of claim 13, wherein the editable blocks are nested.

15. The method of claim 13, wherein the edit includes a request to delete one of the editable blocks.

16. The method of claim 13, wherein the edit includes a request to add a block.

17. The method of claim 13, wherein the implementing of the edit is operating system independent.

18. An apparatus comprising:
a processor; and
a machine-readable medium including one or more instructions for performing the following:
sending a request to edit a first web page having first web page elements;
receiving a second web page, the second web page including second web page elements for displaying of the second web page by a client browser executed by the processor;
displaying the second web page by the client browser enabling editing of editable blocks by the client browser, each editable block associated with one of a corresponding first web page element in the first web page, or information about the first web page in its entirety, the second web page further storing hidden information representing content of the first web page and identifying relationships between the editable blocks, the hidden information enabling display of the content of the first web page without reference to the first web page;

receiving by the client browser an edit to an attribute of at least one of the editable blocks in the second web page;

sending a post by the client browser, the post including the hidden information, the edit by the client browser represented in the post as an edit to a corresponding portion of the hidden information in the post; and receiving a third web page implementing the edit based on the post, the third web page generated without needing to reference the first web page, the third web page different from the first web page based on the edit.

19. The apparatus of claim 18, wherein the editable blocks are nested.

20. The apparatus of claim 18, wherein the edit includes one of a request to delete one of the editable blocks, or a request to add a block.

* * * * *